United States Patent
Tulsi et al.

(10) Patent No.: US 11,620,279 B2
(45) Date of Patent: Apr. 4, 2023

(54) EXTENSIBLE UNIVERSAL LEDGER

(71) Applicant: eShares, Inc., San Francisco, CA (US)

(72) Inventors: Japjit Singh Tulsi, Los Altos Hills, CA (US); Jerry O. Talton, III, Redwood City, CA (US); Daniel Fike, Elmhurst, IL (US); Neeraj Jain, Pleasanton, CA (US); Vrushali Vivek Paunikar, San Francisco, CA (US); Adam Nathan Savitzky, San Francisco, CA (US)

(73) Assignee: eShares, Inc., San Francisco, CA (US)

( * ) Notice: Subject to any disclaimer, the term of this patent is extended or adjusted under 35 U.S.C. 154(b) by 168 days.

(21) Appl. No.: 17/351,122

(22) Filed: Jun. 17, 2021

(65) Prior Publication Data

US 2021/0311933 A1  Oct. 7, 2021

Related U.S. Application Data

(63) Continuation of application No. 17/102,058, filed on Nov. 23, 2020, now Pat. No. 11,068,472.

(60) Provisional application No. 62/940,090, filed on Nov. 25, 2019.

(51) Int. Cl.
   *G06F 16/23* (2019.01)
   *G06F 16/27* (2019.01)
   *G06F 9/54* (2006.01)

(52) U.S. Cl.
   CPC .......... *G06F 16/2379* (2019.01); *G06F 9/54* (2013.01); *G06F 16/27* (2019.01)

(58) Field of Classification Search
   CPC ........ G06F 9/54; G06F 16/2379; G06F 16/27; G06Q 20/389
   See application file for complete search history.

(56) References Cited

U.S. PATENT DOCUMENTS

| 10,198,346 | B1 | 2/2019 | Cole |
| 10,324,905 | B1 | 6/2019 | Ross |
| 10,846,277 | B1 | 11/2020 | Cseri |
| 2009/0300414 | A1 | 12/2009 | Huang |

(Continued)

OTHER PUBLICATIONS

"What is QLDB—QLDB Guide," (2020) [online] (retrieved from https://www.hyperledger.org/wp-content/uploads/2020/03/hyperledger_fabric_whitepaper.pdf), 5 pages.

(Continued)

*Primary Examiner* — Etienne P Leroux
(74) *Attorney, Agent, or Firm* — Fish & Richardson P.C.

(57) ABSTRACT

Methods and systems for an extensible, universal ledger. One of the methods includes receiving at a journal manager engine a register transaction type request for a first transaction type, the journal manager engine reading and writing to a journal that stores a history of object state and of code by which object state is changed, wherein the register transaction type request is based at least in part on a template and specifies at least one action that can be performed as part of the first transaction type; writing the transaction type request to the journal including an operation definition for the first transaction type; receiving a transaction request of the first transaction type; obtaining the operation definition from the journal; executing an operation in response to the transaction request to produce a transaction result; and recording the transaction result in the journal.

19 Claims, 11 Drawing Sheets

(56) References Cited

U.S. PATENT DOCUMENTS

| | | |
|---|---|---|
| 2014/0310170 A1 | 10/2014 | Riehl |
| 2015/0143362 A1 | 5/2015 | Lukacs |
| 2015/0169236 A1 | 6/2015 | Raja |
| 2017/0091772 A1 | 3/2017 | Piel |
| 2018/0276758 A1 | 9/2018 | Posch |
| 2019/0179813 A1 | 6/2019 | MacNicol |
| 2020/0005281 A1 | 1/2020 | Patel |
| 2020/0169412 A1 | 5/2020 | Certain |
| 2022/0230174 A1* | 7/2022 | Khare ................ G06Q 20/389 |

OTHER PUBLICATIONS

Galante et al., "Temporal and versioning model for schema evolution in object-oriented databases", Data & Knowledge Engineering 53: 99-128, 2005.

Hyperledger Fabric, "Open, Proven, Enterprise-grade DLT," (2020) [online] (retrieved from https://www.hyperledger.org/wp-content/uploads/2020/03/hyperledger_fabric_whitepaper.pdf), 2 pages.

International Search Report and Written Opinion in International Application No. PCT/US2020/062055, dated Feb. 25, 2021, 15 pages.

International Preliminary Report on Patentability in International Appln. No. PCT/US2020/062055, dated Jun. 9, 2022, 11 pages.

\* cited by examiner

320

```
receive at a journal manager engine a register transaction type
request for a first transaction type, the journal manager engine
configured to store a history of object state and a history of code
by which object state is changed, wherein the register
transaction type request is based at least in part on a template
322
```

↓

```
write the transaction type request to the
journal including an operation definition for the
first transaction type
324
```

↓

```
receive a transaction request of the first
transaction type
326
```

↓

```
obtain the operation definition from the journal
328
```

↓

```
execute an operation in response to the transaction
request and based at least in part on the operation
definition to produce a transaction result
330
```

↓

```
record the transaction result in the journal
332
```

FIG. 3B

EXTENSIBLE UNIVERSAL LEDGER

CROSS-REFERENCE TO RELATED APPLICATIONS

This application is a continuation of, and claims priority to, U.S. application Ser. No. 17/102,058, for Extensible Universal Ledger, which was filed on Nov. 23, 2020, which claims the benefit of the filing date of U.S. Provisional Application No. 62/940,090, for Extensible Universal Ledger, which was filed on Nov. 25, 2019. The disclosures of the prior applications are considered part of and are incorporated by reference in the disclosure of this application.

BACKGROUND

Technical Field

This specification relates to an extensible universal ledger, e.g., a universal ledger that is extensible at run-time.

Background

Current ledgers are tied to the underlying asset or the product it services. The tying of a ledger to the underlying asset makes transaction tracking, exchange or accounting onerous. Different ledgers with different event sources are often in use when an event occurs. As a result, those responsible for tracking the impact of an event (e.g., issuance of stock to employees or a new fundraising round) need to export from one ledger to another and massage the data to get it to be correct in the receiving ledger. As a result of the requirements for such a transfer of some of the resulting data, the resulting data can be incorrect, differently summarized or hard to correlate.

SUMMARY

This specification describes technologies for an extensible, universal ledger, e.g., an append-only ledger that records an abstract tracking unit for multiple purposes. In one implementation, the ledger is template-based, event-based and self-referential. The ledger includes a bitemporal journal that stores a sequence of events over time and a journal manager engine for expressing how the journal is manipulated as provided from the outside world (i.e., as provided from a source external to the ledger). The ledger technology defines an event ledger which stores the sequenced time based event history, and sub-ledgers which are journal line entries and state grouped by rules-based functionality that is configurable by end users and not dictated by the system itself. In addition, the universal ledger: stores journal manager code in a universal ledger; stores state that the journal manager code produces in the universal manager; and provides applications with access to the state that the journal manager code produces.

In general, one innovative aspect of the subject matter described in this specification can be embodied in methods that include the actions of: loading journal manager engine instructions for a journal manager engine into journal manager engine memory, the journal manager engine instructions being stored by a journal that stores instructions and a series of transactions including a time of each transaction in the series of transactions, wherein the journal manager engine reads from, and writes to, the journal; receiving a register transaction type request for a first transaction type at the journal manager engine, wherein the register transaction type request includes a first transaction type operation definition that specifies at least one type of action that can be performed as part of the first transaction type; loading a register transaction type operation definition for a register transaction type operation in response to the register transaction type request, wherein the journal stores the register transaction type operation definition; writing the register transaction type transaction to the journal; executing the register transaction type operation in response to the register transaction type request and based at least in part on the register transaction type operation definition to produce a first transaction type operation definition; and recording the first transaction type operation definition in the journal.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method can further include loading a definition of hooks into the journal manager based at least in part on the register transaction type request. A hook is an instruction to the Universal Ledger (UL) to execute an additional specified ledger action when a specified external event happens. The method can further include executing callbacks based at least in part on the definition of hooks. The journal manager and the journal can be part of a ledger, wherein the register transaction type request is a request to create a first transaction type that the ledger can perform, and the method can further include: receiving a transaction request for a transaction of the first transaction type; and performing the transaction of the first transaction type. The transaction request can recalculate a state of a parameter at a first time, and the journal can stores a first state for the parameter at the first time based on a request made at a second time wherein the first state is different than a second state for the parameter at the first time based on a request made at a third time.

The journal can include a series of state snapshots, each state snapshot can have a time-stamp, and the method can further include creating a fingerprint of a state snapshot and forwarding the fingerprint to a blockchain. The ledger can be extensible at runtime allowing a client to update dynamically which instructions the ledger executes. Runtime is the period of time when a program is running. It begins when a program is opened (or executed) and ends when the program is quit or closed. The journal manager engine instructions can be based at least in part on a template. Similarly, the request transaction type request can be based at least in part on a template. Receiving a register transaction type request can include receiving a register transaction type request via an application programming interface.

Another innovative aspect of the subject matter described in this specification can be embodied in methods that include the actions of: receiving at a journal manager engine a register transaction type request for a first transaction type, the journal manager engine configured to read from and write to a journal that is configured to store a history of object state and a history of code by which object state is changed, wherein the register transaction type request is based at least in part on a template and specifies at least one action that can be performed as part of the first transaction type; writing the transaction type request to the journal including an operation definition for the first transaction type; receiving a transaction request of the first transaction type; obtaining the operation definition from the journal; executing an operation in response to the transaction request and based at least in part on the operation definition to produce a transaction result; and recording the transaction result in the journal.

The subject matter described in this specification can be implemented in particular embodiments so as to realize one or more of the following advantages. Embodiments of the universal ledger reduce friction by enabling different applications to use the same events across products (e.g., cap tables, exchanges, banking, and analytics). For example, during a financing round, a company issues new shares, assets can be diluted across the existing owners, fund administrators can get new values, and new accounting/audit log values are recorded on the same event, wherein the master event has different journal line entries across the company, fund and employees sub ledgers. To be clear the system captures accounting/audit log data within a single master event record, which in turn materializes distinct journal line entries across multiple sub-ledgers.

As noted above, the universal ledger is template-based, event-based and self-referential. A universal ledger as described in this specification can provide an authoritative sequence of events where the ledger can derive the state of what it monitors at any point in time. The journal keeps copies of the state of every business object of relevance at all points in time. A user of the universal ledger can pick any point in time and receive authoritative data for that point of time from the ledger. The state of the sub-ledgers can also be recreated using the event ledger authoritatively.

The universal ledger can include an engine for expressing how the journal is manipulated in ways that are provided from the outside world (e.g., by a client) as opposed to being part of the ledger's initial expression. Thus the term self-referential means that the ledger doesn't necessarily understand where data is going inherently, rather one or more clients can provide the ledger with at least some of the instructions regarding how to handle the data and the ledger stores the instructions in the journal. The instructions can be based on templates and versioned. Thus the journal in the ledger stores not just this history of object state, but also a history of the instructions by which that object state is manipulated. In addition, a journal manager engine that loads instructions from the journal reads and writes to the journal.

Because in certain implementations each object stored in the ledger contains explicit references to the instructions by which one operates upon it, individual objects can contain exceptional and unique instructions. In existing systems, unique situations are typically addressed by adding unique logic to a set of instructions that is otherwise shared by many systems and entities. This unique logic grows exponentially in complexity as they may or may not interact with each other in unexpected or unintended ways. This often results in unintended side-effects. By limiting the unique logic only to affected objects, one greatly reduces these risks.

The ledger can include a bitemporal journal. For example, consider a situation where shares are granted to a set of employees today but not approved by the board for a week. Using a self-referential ledger (i.e., a ledger that incorporates both a journal manager (e.g., journal manager code) and a bitemporal journal), one can determine the state of the ledger at time t viewed at time t+x and also determine the state of the ledger at time t viewed at time t+y. In other words, the ledger state at time t viewed at time t+y (e.g., after an employee share grant has been approved by the board) may be different from the ledger state at time t when viewed at time t+x (e.g., prior to board approval of an employee share grant).

The Ledger does not merely have a record of what the "world state" was at any given point in time, it also has a record of precisely what code/logic was executed in order to transition data from one state to another. Thus, the ledger can record not only that "The value went from 5 to 10 at this time", but it also contains an explicit explanation of why that happened.

Since computers are deterministic (whereas people are not), the ledger can re-execute the stored code/logic to get a deterministic result. The deterministic nature of the ledger can be used to verify that the ledger gets the same results as a check on the integrity of the ledger. This deterministic nature also allows the system to insert events into the past and "playback" the previously-executed code/logic verbatim, ensuring that the system doesn't re-interpret past events.

Consider a "WithdrawMoney" command in some account's timeline within the ledger. Perhaps old implementations of this "WithdrawMoney" command allowed a user to freely overdraw the user's account and go negative, but current implementations apply a charge when that happens. If one needs to record a withdrawal retroactively from 10 months ago, it is important that the ledger use the same withdrawal code/logic as it did at the time of the original withdrawal, i.e., the code/logic from 10 months ago.

It is not practically possible for a human to keep track of code/logic changes, when they occurred and when actions were taken relative to those code/logic changes, especially when the code changes are more than 10 or more than a hundred and when the actions, e.g., deposits and withdrawals, are more than 100, or more than 1000 or more than 100,000, or more than 1,000,000. The incorporation of old and new code along with the data the code operates on in a single ledger journal so that the old and new code coexist simultaneously in a single running application provides the advantages noted above.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B is a flowchart of another example of a universal ledger process

Like reference numbers and designations in the various drawings indicate like elements.

DETAILED DESCRIPTION

This specification describes technologies for an extensible, universal ledger, e.g., an append-only ledger that records an abstract tracking unit for multiple purposes. In one implementation, the ledger is template-based, event-based and self-referential. The ledger can include a bi-temporal journal that stores a sequence of events over time and a journal manager engine for expressing how the journal is manipulated via instructions provided from the outside world. In certain implementations, the universal ledger: stores journal manager code in a journal; stores state snapshots that the journal manager code produces in the journal; and provides applications with access to the state snapshots that the journal manager code produces and stores in the journal.

Figure 1:
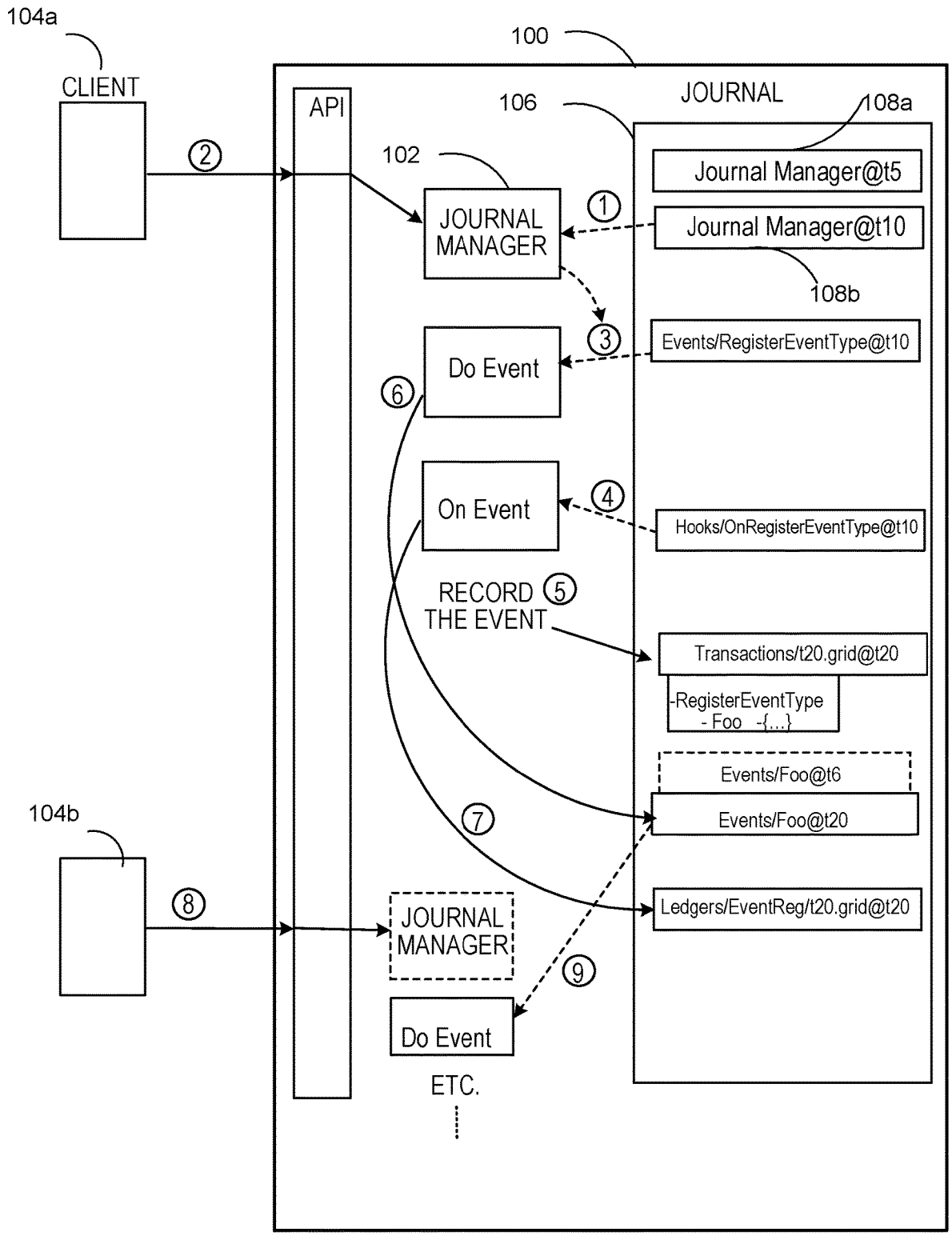
FIG. 1 is a block diagram of one example of a universal ledger.

FIG. 1 shows an example universal ledger system 100. The universal ledger 100 can include an engine, e.g., a journal manager engine 102, for manipulating the journal in ways that can be provided from a source (e.g., a client 104a) external to the system as opposed to being part of the ledger's initial expression. Initial journal manager operation instructions 108a, 108b are stored in the journal. As illustrated in FIG. 1, those instructions can include a time-stamp. In the illustrated example, the journal contains one set of journal manager instructions recorded at time t5 and another set of journal manager instructions recorded at time t10. In the diagram, 108a can represent an initial bootstrapped JournalManager, but 108b can be a subsequent version of that JournalManager that has been updated by a client. The journal manager 102 reads from, and writes to, the journal 106.

In addition to journal manager instructions 108a, 108b being stored as code in the journal 106, the ledger system can receive instructions from an external source such as client 104a. Such externally provided instructions can include instructions regarding what kind of actions the journal manager and/or a user can perform for a specified type of transaction. The externally provided instructions regarding permitted actions are recorded in the journal 106 from which they can later be referenced by the ledger and executed by a journal manager. These externally provided instructions can be grouped together into templates. Such templates are described further below with regard to FIG. 4.

The journal 106 in the ledger 100 stores not just a history of object state, but also a history of the instructions by which the ledger manipulates that object state. If the ledger contains a sequence of events that happened over time, and the ledger has the history of all instructions that defined what actions would have taken place at all points in time and if the ledger has the instructions by which the ledger interpreted those actions and persisted the outcome to disk, then the ledger can fully re-play all transactions in order to re-materialize any derived state and the ledger can inject an event at a specified time in the past and play the resulting events forward from that specified time in the past to observe what the cascading implications are based on the injected event.

The Universal Ledger includes a journal full of bitemporal data, and a Universal Ledger service allows users to submit requests to manipulate that data. However, rather than specifying a mandatory format for precisely how those requests must be structured, the ledger allows a client to send any commands so long as the client first defines a JournalManager capable of interpreting those commands and converting them to JOURNAL operations.

These requests are also recorded in the JOURNAL (as "events"), as are the JournalManagers that evaluated them, so that the ledger can re-execute the requests at a later date and necessarily get the exact same behavior. If either of these were not stored in the journal, then changes that have been made to the ledger implementation since an event originally occurred might mean a re-execution yields different results.

Typical pattern might be:

1. Teach the Ledger how to interpret "Lua" code into Journal read/write operations.

2. Teach the ledger about a new event type named "debitBalance". This contains a bunch of Lua code that describes how objects in the Journal should be manipulated to deliver the intended result.

3. Fire an actual "debitBalance" event at the ledger with parameters indicating which account to debit and by how much.

Thus, one can describe an implementation of a ledger as self-referential in the following sense. The journal contains not just the history of object state but also a history of the code which the journal manager uses to manipulate object state. The ledger doesn't necessarily have all instructions about how to handle all the data it eventually receives when a user engages with it initially, rather one or more users/clients can provide the ledger with at least some of the instructions regarding how to handle the data and the ledger stores the instructions in a journal 106. However, the journal contains everything that a user needs to reconstruct state based on a newly injected event.

To use a stock grant example, assume an employee receives a stock grant in August subject to board approval and it takes until December for the board of the employee's company to approve the employee's stock grant and that the employee's grant vested monthly. The ledger can create the stock grant issuance effective as of August. To be more specific, the ledger can ensure that the company has enough authorized shares by replaying the full set of logic and validating that each of the relevant operations that have now happened under the replay scenario (e.g., where the employee stock grant was in place to begin with as of August) would have proceeded without issue.

Template-based programs are stored in the journal and executed by the journal manager, enabling the replay described above. In other words template-based code can be stored in the journal, so that a replay is not only acting on time-stamped data, but is executing time-stamped logic. In fact, template-based code can be stored and otherwise behave so much like other objects in the journal that, in one implementation, the template-based code itself is manipulated by a template-based code for manipulating a template. Updates made using template-based code are triggered via events expressed in the template-based code.

The JournalManager defines how the Journal is stored. Implementations of a Journal Manager:
  a. May be stored in the Ledger itself;
  b. Define how to persist Event records to a permanent storage (disk, database, etc);
  c. Define how to persist materialized object state;
  d. Define how to fetch/scan previously written data; and
  e. Define how to interpret template code.

The Universal Ledger code itself requests that the JournalManager fetch template code (and object state), feeds that code to an interpreter that, amongst other things, expresses ledger I/O in simple terms (e.g., spawn another event, get object state, write object state). The JournalManager can fulfill the template-based event read/write requests and carry those results back to the interpreted code for consideration.

The phrase "the Universal Ledger code itself" can be understood as follows. The Universal Ledger is software comprised of code that is a service but the Universal Ledger in turn is also handed additional code (e.g., from a client) that the Universal Ledger stores and that it executes. Sometimes when the Universal Ledger "runs code" it runs other "code"-Thus the phrase "the Universal Ledger code itself" is making a distinction between code that is provided by a client, and the code that makes up the Universal Ledger's initial implementation. In other words, the phrase "Universal Ledger code itself" is code that is written by implementers (as opposed to clients/users) to implement certain aspects of the Universal Ledger itself. Element 106 in FIG. 1 is all data and boxes within it are data. If one removes 106 from consideration of 100 altogether, then one can say it is 100 that is making the request of the Journal Manager to fetch the template. "Universal Ledger code itself," can be thought of as a reference to the "ledger's initial expression". Clients provide instructions to the ledger (as a JournalManager or event type definitions). The ledger is itself a service application authored in code that receives/fetches those other entities and executes them.

The Universal Ledger code itself can also be responsible for extending the template-based event read/write requests with appropriate temporal constraints so the correct data is passed/requested to/from the JournalManager. An event instance can be submitted to the Ledger and fulfilled/handled by some code previously registered that defines the event. The event instance submission has an "effective time" at which it is said to occur (often "now", i.e., at the time of submission, but not always). The logic of the event type definition does not need to consider this timing. It merely expresses reads/writes of journal data, and the ledger transparently reads data as-it-existed at that point in time, and associates newly written data with that point in time.

As noted above, FIG. 1 is a block diagram of one example of a universal ledger and shows a process that such a universal ledger can perform. With reference to FIG. 1, at step 1, the ledger 100 loads journal manager instructions 108 into memory of the journal manager 102. As a result the journal manager has instructions regarding how to interact with the journal, e.g., how to write to the journal. At step 2, a client 104a performs an operation; in the illustrated example, the client informs the ledger of a new type of event or transaction that can take place. This specification will use event and transaction interchangeably. Registering an event type, much like any other action a client can perform on a ledger, goes through the same pipeline as it is recorded in the journal. In one implementation, "Register Event Type" is a pre-existing registered event type bootstrapped into the Ledger when first deployed. At step 3, the journal manager loads the definition of an event type registration. At step 4, the journal manager loads the definition of secondary hooks or callbacks (described further below) that respond to an event transpiring. As noted above, a hook is an instruction to the Universal Ledger (UL) to execute an additional specified ledger action when a specified external event happens.

At step 5, once the journal manager has loaded that data, it writes one authoritative row to the journal that can include the time of the write, the event type, the definition of the event type and can further include the identity of the client that registered the event type. For example, the journal entry can record that, at time t+20, client 104a registered an event type, the event type is called FOO, the event type has a specified definition, and it is of event type RegisterEventType. The event type FOO could be for example a stock issuance event type.

Thus the Universal Ledger can operate as follows:
1. The Universal Ledger (UL) loads the instructions to execute to fulfill the event;
2. The UL can write a single authoritative element to the journal to indicate the event has transpired; and
3. The UL executes the loaded instructions which further manipulate the journal as it runs.

An alternative implementation can proceed as follows:
1. The UL loads the instructions to execute to fulfill the event;
2. The UL executes the loaded instructions and buffers all journal writes to a temporary location (from which additional journal reads are sourced);
3. The UL writes a single authoritative element to the journal to indicate the event has transpired; and
4. The UL flushes all buffered journal writes into the journal.

The first implementation pattern described above works well if the Journal is implemented using an ACID-transactional database such as MySQL. If something goes wrong when executing the user-provided instructions, the entire operation can roll back and the database remains unchanged.

In the alternative implementation pattern described above, the UL can be implemented using something other than an ACID-transactional database, such as BigTable. Bigtable is a compressed, high performance, proprietary data storage system built on Google File System, Chubby Lock Service, SSTable (log-structured storage like LevelDB) and a few other Google technologies. In this implementation, the UL doesn't write a single element into the permanent journal store until the UL has verified that ALL user-provided code executes without error.

Thus, clients of the ledger can provide instructions to the ledger that indicate what acts the ledger can perform and the instructions to perform the acts. The journal manager can execute those instructions when users attempt to perform the specified actions and the journal manager can record one authoritative record, e.g., it can record an event as illustrated in step 5, in the journal. After step 5 is completed and the ledger has authoritatively recorded the event type, the journal manager can execute, at step 6, the actual logic that it has registered for the event type. For example, it is at this point that the ledger can decrement numbers, and increment numbers to reflect changes in ownership if that is what the event involves. At this point the journal manager takes action to make the ledger state consistent with this amended sequence of operations that has been defined.

At step 6, the journal manager adds a new record for the "FOO Event Type" introduced by the client 104a. The new record is added at time t=20 and it masks a previous version of that record because the ledger is creating snapshots over time. At step 7, an "on event" action occurs to execute callbacks. With regard to executing callbacks, a user can provide code to the ledger that instructs the ledger to run the code when a specified event occurs. When a user submits an instance of event "X" to the ledger, the UL invokes the logic previously registered as the "X" Event Type definition. Similarly, when event "X" completes, the UL invokes any logic registered prior as an "X" Event Hook. This allows other users or systems expressed in the ledger to "react" to an event having taken place. Either way, users are registering code that runs when users submit events to the ledger. A good illustration is the following: When a client/user submits a "Debit" event to reduce the balance of some "cash account" object, they may want to trigger additional logic that inspects the resulting balance and, if it is below zero, creates an "Overdraft" charge. A "CashAccountDebit" event type can be registered and an "OnDebitCheckOverdraft" hook can be registered before the event instance is submitted to the ledger. If an error occurs in the Callback, the original Event may be said to have succeeded or failed depending on how the ledger is implemented.

Step 7 reflects a hierarchical nature of the ledger. The ledger provides an authoritative source of truth where all operations take place in the universe of the ledger. Based at least in part on this authoritative source of truth, applications (shown in FIG. 2 described further below) can derive logical ledgers that actually express results (e.g., a capitalization table, exchange displays, banking statements and analytics) that are of relevance to various stakeholders. Some of these results are what is typically thought of as a ledger. Certain implementations of a universal ledger record how all relevant event definitions have changed over time. Thus, in the stock issuance example, the universal ledger can also have a recording of all stock issuances. An application can take just the transactions that occurred that were related to stock issuances and denormalize them into a separate ledger that is a subset of all historical transactions.

In other words, in addition to the universal ledger allowing a client to register a stock issuance event type, where the client is able to use a stock issuance template to indicate what it means to vest with rules and validation logic custom to that client, the universal ledger can also allow $3^{rd}$ parties e.g., other authorized departments or domains, to subscribe to or extend that definition. For example, such a 3rd party can use the definition of exercise of an option to trigger some secondary or tertiary effect. Such a 3rd party wants to be alerted, e.g., in near real-time, about the exercise of an option so that the 3rd party can trigger the secondary effect without the 3rd party needing to change the original template or event type definition. Thus, callbacks provide a way to extend the impact of an operation while allowing the original code author/owner/asset creator to have their own definition of the event/transaction type.

Returning to FIG. 1, the ledger has recorded the registration of a new event type called "FOO." A client can now ask the ledger to perform "FOO". The ledger did not initially know what "FOO" is, i.e., it was not baked into any of the ledger's initial code. Rather "FOO" was authored by a client. The client provided the "FOO" instructions and the journal manager executes those instructions. Registering events can be based on standard asset unit templates. Standard asset unit templates can provide rules that comprise the definition of an event type.

At step 8 a client 104b submits an event FOO, e.g., with one or more parameters to the journal manager, e.g., via an application programming interface (API). At step 9, in response to the submitted event, the journal manager 102 loads from the journal 106 the definition for the FOO event type (e.g., stock issuance) of the submitted event, e.g., the specific FOO event (the issuance of 100 shares to employee X). The journal manager 102 then executes the event and records the event and the results of the event (in the form of a state snapshot) in the journal.

Figure 2:
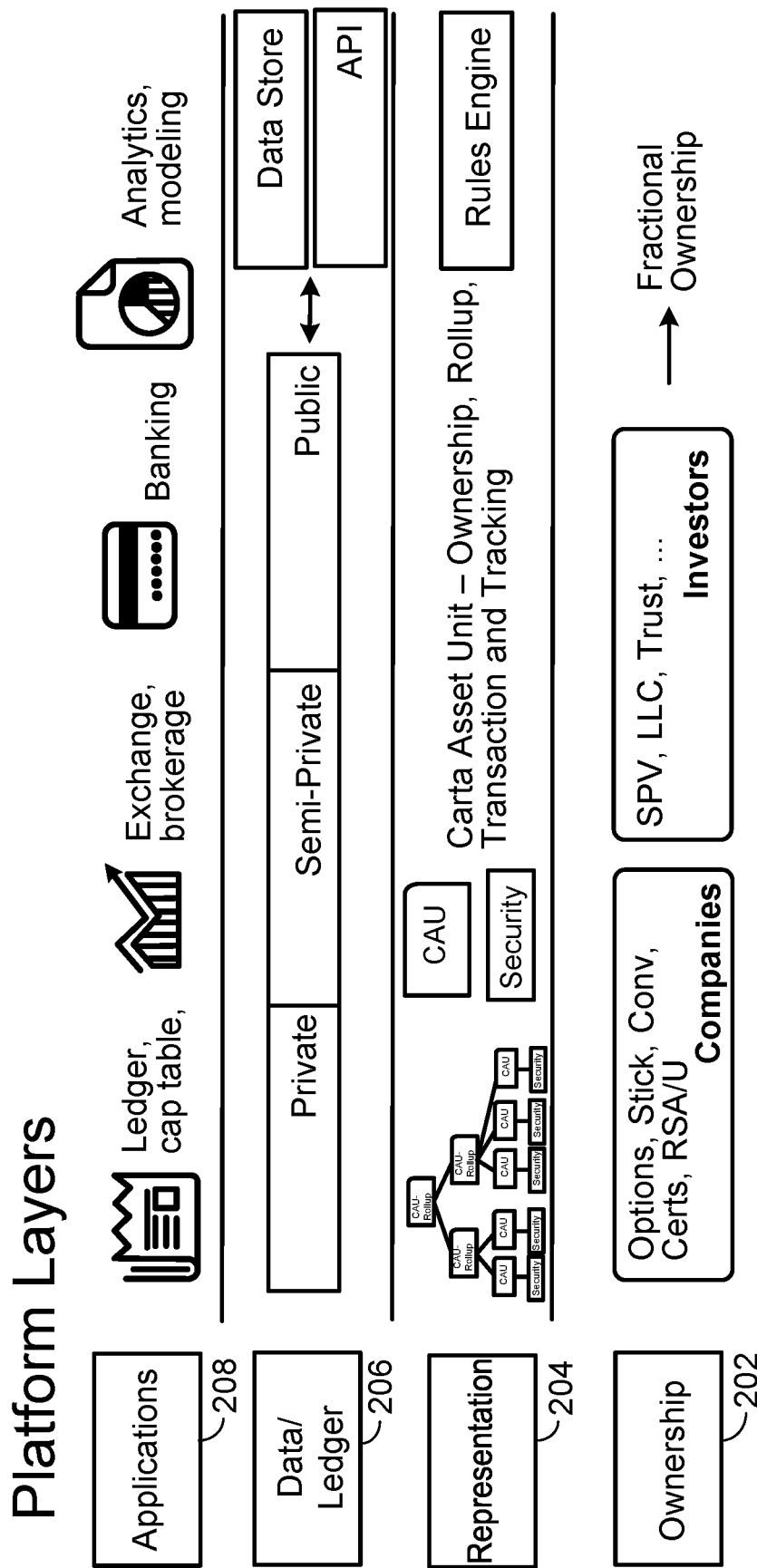
FIG. 2 illustrates one example of platform layers that includes a ledger such as the ledger illustrated in FIG. 1.

FIG. 2 illustrates one example of platform layers 200 that include a ledger such as the ledger 100 illustrated in FIG. 1. The platform layers include an ownership layer 202, an abstraction layer 204, a data/ledger layer 206 and an application layer 208 at the top of stack. The ownership layer 202 can include any form of fractional ownership such as ownership by investors and employees, e.g., via options or stock and ownership by investors by other means, e.g., by a special purpose vehicle or trust. It can also include company debt.

The abstraction layer 204 can include a standard asset unit that stores multiple asset types with embedded rules to simplify and abstract storage and enable simple and friction-free transactions. Such a model enables a global transaction capability, enables partners to transact with reduced friction, and simplifies ownership management for companies, investors, and individuals. The abstraction layer 204 can also include a rules engine (which can be authored, e.g., in Java, Kotlin). In one implementation, the rules engine can operate as follows: 1) a client can make an API request; 2) an API implementation can invoke the Ledger library; 3) the Ledger library can look up the rules using the journal api; 4) the rules themselves can read/write data using the Ledger Library; 5) data can be read from/written to using the journal api; and 6) the Journal interacts with the physical data layer and records data with respective timestamps.

The data/ledger layer 206 can include at least one private ledger, at least one semi-private ledger or at least one public ledger or a combination of these. The data/ledger layer can also include an API and data sources.

The application layer 208 can include a variety of applications that access the data/ledger layer 206. The applications can include a capitalization table application, an exchange application, a banking application, and/or an analytics application.

Figure 3A:
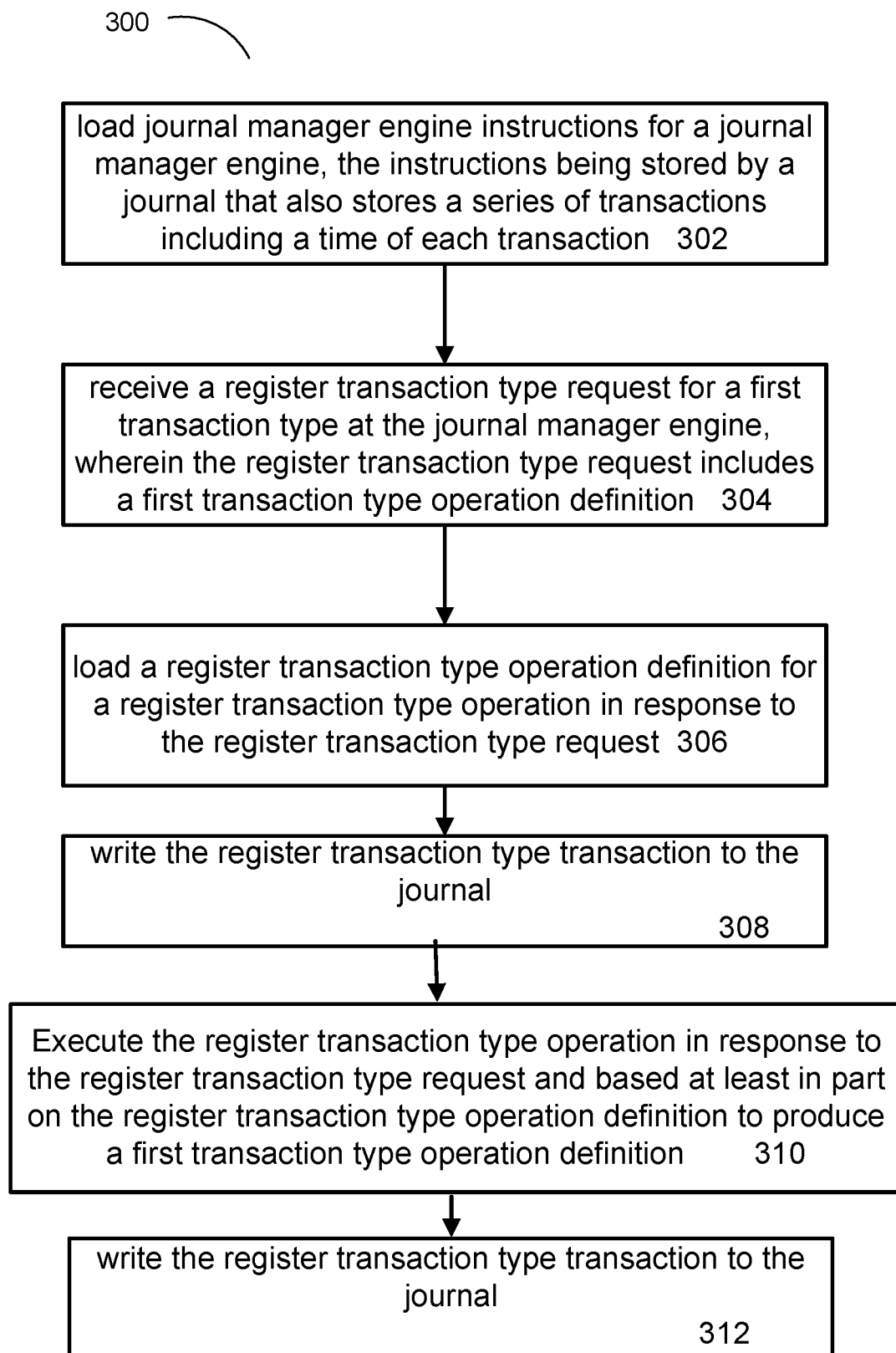
FIG. 3A is a flowchart of one example of a universal ledger process.

FIG. 3A is a flowchart of an example process 300 for operating a universal ledger. For convenience, the process 300 will be described as being performed by a system of one or more computers, located in one or more locations, and programmed appropriately in accordance with this specification. For example, a universal ledger system, e.g., the universal ledger system 100 of FIG. 1, appropriately programmed, can perform the process 300.

The process 300 can include: loading 302 journal manager engine instructions for a journal manager engine into journal manager engine memory, the journal manager engine instructions being stored by a journal that stores instructions and a series of transactions including a time of each transaction in the series of transactions, wherein the journal manager engine reads from, and writes to, the journal; receiving 304 a register transaction type request for a first transaction type at the journal manager engine, wherein the register transaction type request includes a first transaction type operation definition that specifies at least one type of action that can be performed as part of the first transaction type; loading 306 a register transaction type operation definition for a register transaction type operation in response to the register transaction type request, wherein the journal stores the register transaction type operation definition; writing 308 the register transaction type transaction to the journal; executing 310 the register transaction type operation in response to the register transaction type request and based at least in part on the register transaction type operation definition to produce a first transaction type operation definition; and recording 312 the first transaction type operation definition in the journal. The process can further include a client or separate service or application (e.g., a capitalization table, an exchange, a brokerage, a banking application or an analytics application) querying the UL for data regarding the current state of the ledger.

FIG. 3B is a flowchart of an example process 320 for operating a universal ledger. For convenience, the process 320 will be described as being performed by a system of one or more computers, located in one or more locations, and programmed appropriately in accordance with this specification. For example, a universal ledger system, e.g., the universal ledger system 100 of FIG. 1, appropriately programmed, can perform the process 320. The exemplary process 320 can include: receiving 322 at a journal manager engine a register transaction type request for a first transaction type, the journal manager engine configured to read from and write to a journal that is configured to store a history of object state and a history of code by which object state is changed, wherein the register transaction type request is based at least in part on a template and specifies at least one action that can be performed as part of the first transaction type; writing 324 the transaction type request to the journal including an operation definition for the first transaction type; receiving 326 a transaction request of the first transaction type; obtaining 328 the operation definition from the journal; executing 330 an operation in response to the transaction request and based at least in part on the operation definition to produce a transaction result; and recording 332 the transaction result in the journal.

As noted above, the initial journal manager instructions and/or externally provided instructions such as instructions for a new event/transaction type, can be template-based. As noted above, an implementation of the universal ledger can have the rules and business logic that govern a business object/asset co-exist with the data that comprises that asset. As these rules and logic are used and re-used, it makes sense to identify common rules and business logic and make them easily re-usable as templates. The templates of the universal ledger can be used to stamp out new objects with the same set of rules. In some implementations, everything the ledger stores can be described and identified by a template. These templates describe the data a user wants to store in the ledger and the operations that are able to manipulate that data. If a user wants to store a new kind of object or asset in the ledger, the user need only create one of these templates. These blocks of code are then stored directly within the ledger itself (e.g., in the journal). One can also store supplementary rules in the ledger that allow a user to extend templates with additional business logic.

Figure 4:
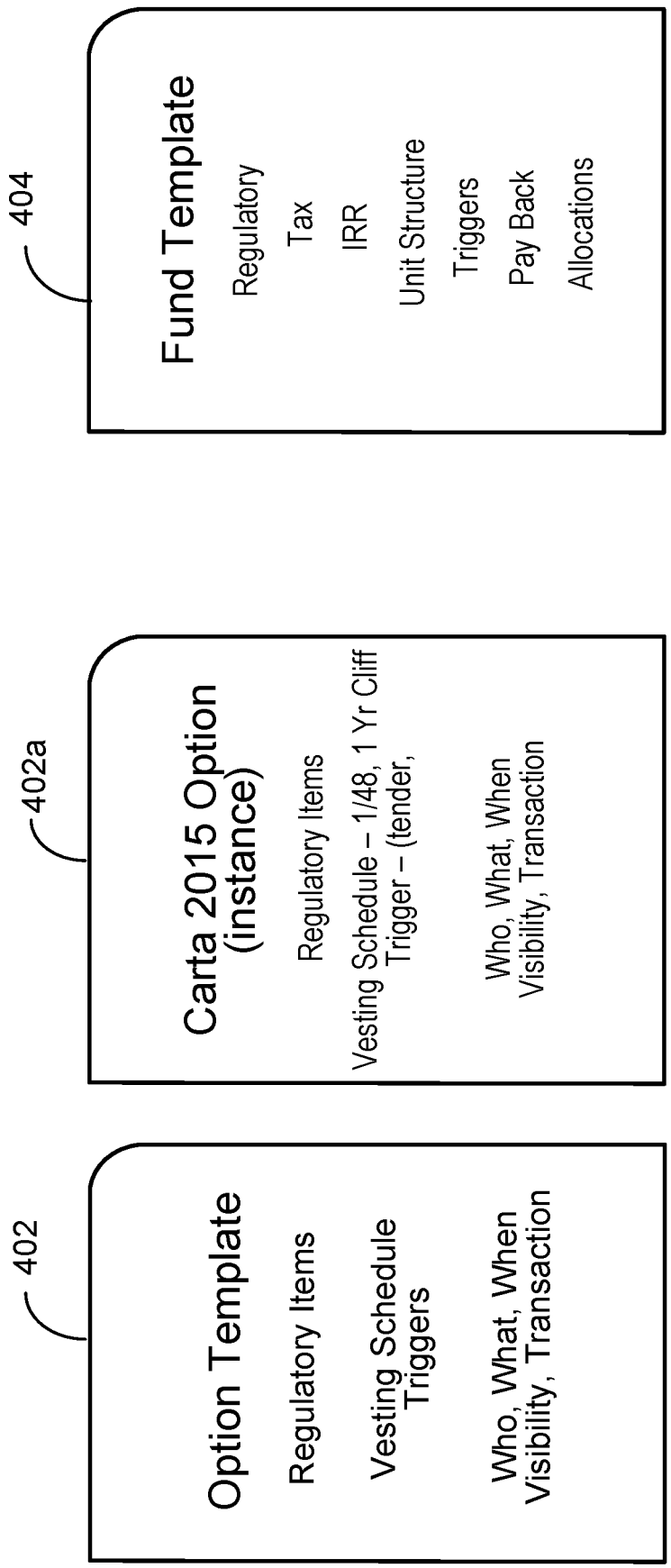
FIG. 4 shows aspects of various exemplary templates for use with the universal ledger of FIG. 1.

FIG. 4 shows aspects of exemplary templates that the universal ledger system, e.g., the universal ledger system of FIG. 1, can use. With reference to FIG. 4, an option template 402 can include a variety of parameters and/or rules (e.g., coded rules) regarding regulatory constraints, a vesting schedule, to whom the options are being granted, and how many options are at issue. An instance 402a of the option template can include that the vesting schedule provides for the first vesting to occur on the year anniversary of the employee's employment with ¼ of the employee's grant vesting on that anniversary and after that anniversary date ⅟₄₈th of the grant vesting every month on a going forward basis. A different template for a fund 404 can include regulatory, tax, internal rate of return, unit structure, triggers, pay back and allocation parameters and/or rules.

Figure 5A:
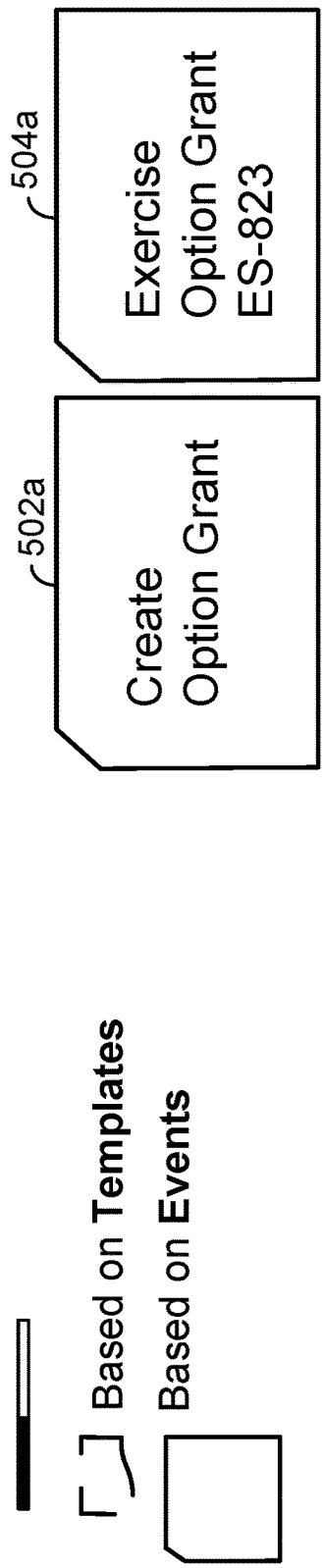
FIG. 5A is an example of a stream of events in a universal ledger.
Figure 5A:
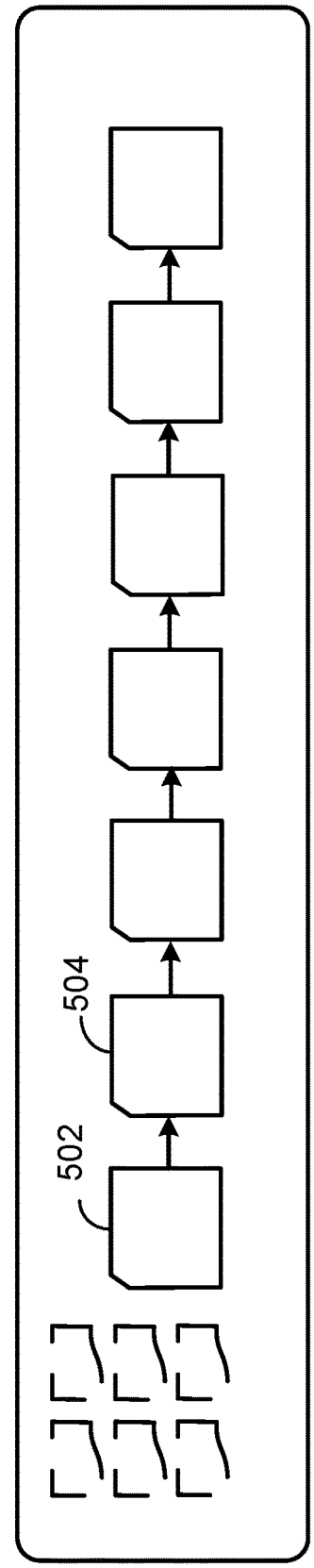

In certain implementations, every manner by which data stored in the ledger is manipulated can be expressed in terms of templates, and the ledger can store a record of those data manipulations. These events are not only recorded by the Ledger, but they are actually executed by the Ledger. This authoritative sequence of events forms the absolute source-of-truth for the ledger. The business logic in the templates defines what these events actually do, which might involve triggering additional events, but will often mean changing state data in the ledger. FIG. 5A is an example of a stream of events, e.g., events 502 and 504, in a universal ledger. Examples of events can include creating an option grant 502a or exercising a specific option grant 504a.

Figure 5B:
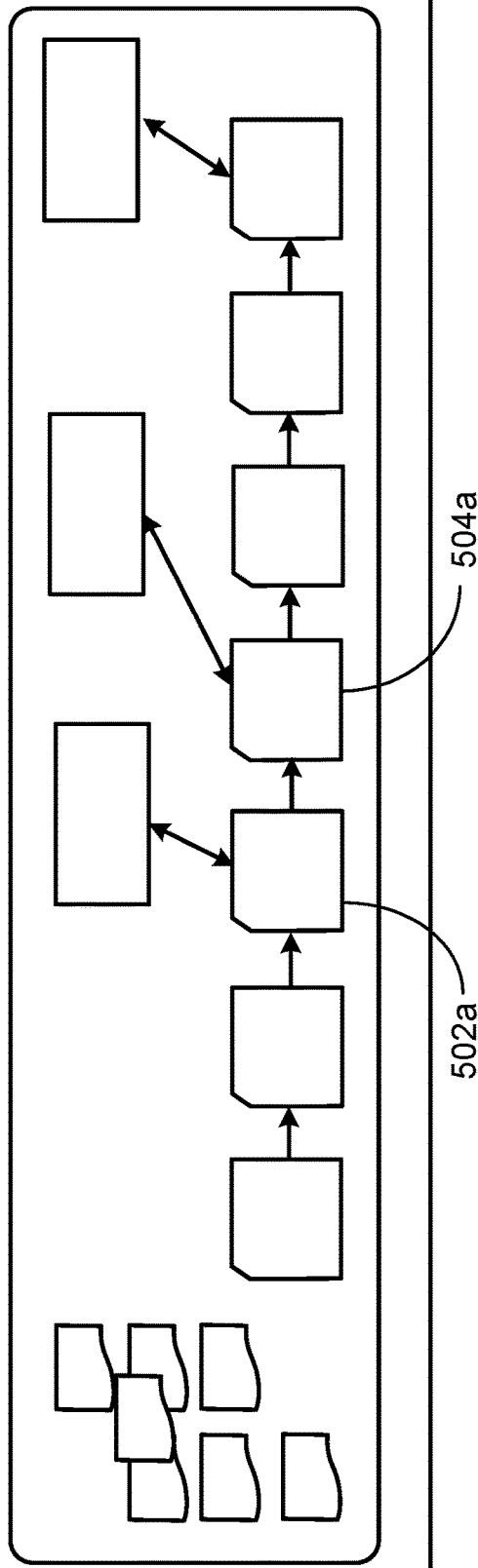
FIG. 5B is an example of state snapshots connected to the stream of events of FIG. 5A.

The ledger also has business data in the form of state snapshots. While templates are defining the types of business data the ledger can create, and the events describe when the ledger creates that data or operates upon it, these snapshots record the state of the data is after each event. In certain implementations, unlike a traditional database, the ledger doesn't replace the data when the ledger changes the data, rather the ledger just adds another snapshot. The snapshots and the events that triggered are recorded, so the ledger has data on not only what changed, but also on why that data changed. The universal ledger can use this data together to make itself audit-defensible, being able to provide evidence and justification behind everything that happens in the ledger. FIG. 5B is an example of state snapshots connected to the stream of events of FIG. 5A.

Figure 5C:
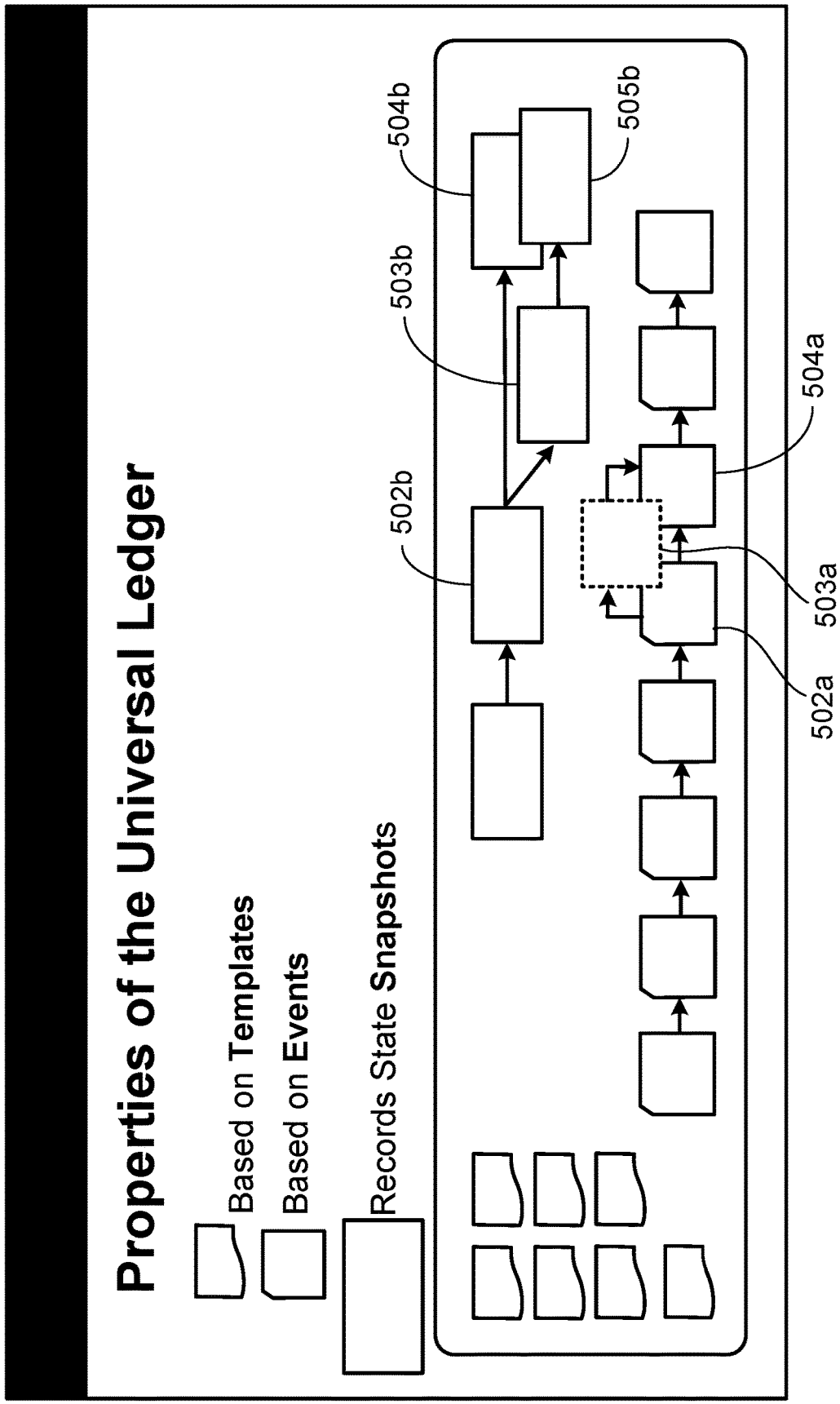
FIG. 5C is an example of a steam of events where an event has been injected into the stream of events resulting in a bi-temporal stream of state snapshots.

These state snapshots are actually bi-temporal, meaning the ledger actually has the ability to inject or amend an event retroactively. That event can execute according to the state of the ledger at the point in time in which the event is injected, and then the ledger can execute from that point in time with the new event to re-play subsequent events and derive new state snapshots that may have changed. Because all events have their corresponding code stored within the ledger, the ledger can re-execute all of the logic behind an event. Because the ledger can access the old object state, the ledger can ensure these events are deterministic and idempotent. FIG. 5C is an example of a steam of events where an event (such as event 503a) has been injected into the stream of events (such as events 502a and 504a) resulting in a bi-temporal stream of state snapshots. The stream of state snapshots splits into two streams (one stream being formed by state snapshots 502b and 504b and the other stream being formed by state snapshots 502b, 503b and 505b).

The event records are not only a mechanism to support replay and create an authoritative source of truth. They are themselves data and are designed to be consumed as such. In order to make that data more useful, the universal ledger is multi-level and can be configured to derive child ledgers that contain a curated subset of events. These child ledgers can effectively be synchronized with one another, as their events all trace back to one single top-level event in the master sequence.

An implementation of the universal ledger can update and store snapshots of summary objects. These summary snapshots are collections of regular objects which satisfy some set of conditions at some point in time. These summaries, for example, make it easy to determine exactly who might have been on a company's cap table at a specific point in time.

Figure 6A:
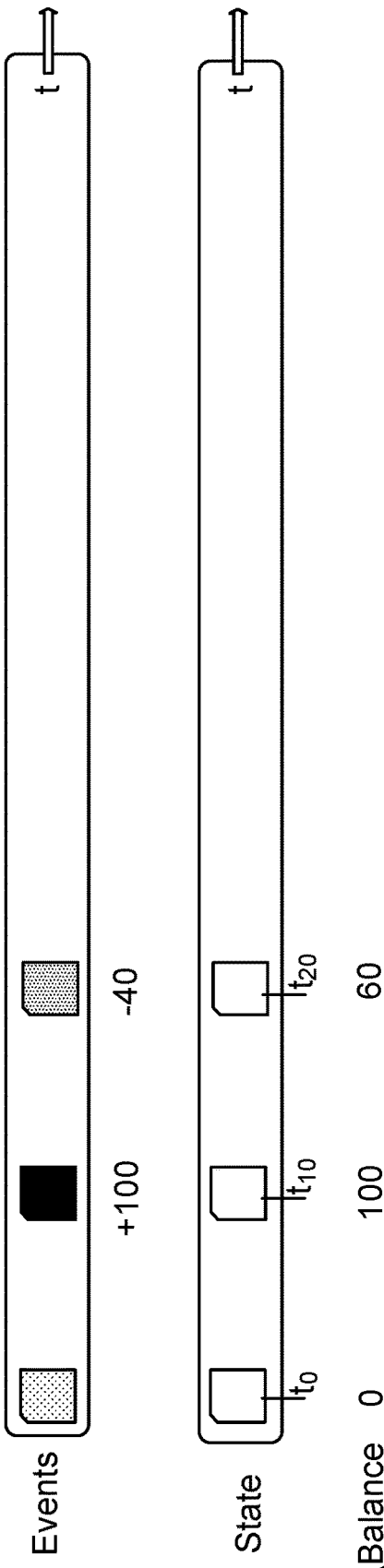
FIG. 6A is an example of the universal ledger applied to a checking account
Figure 6B:
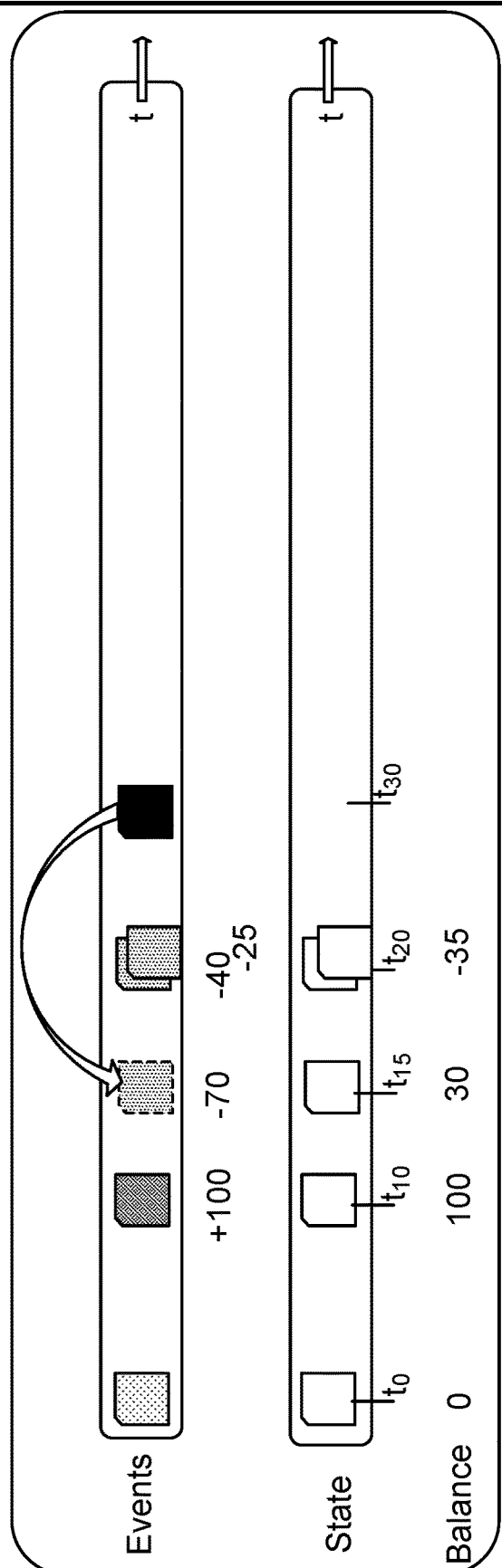
FIG. 6B is an example of a retroactive withdrawal.

FIG. 6A is an example of the universal ledger applied to a checking account. More specifically, FIG. 6A show a deposit of $100 at time t10 and withdrawal at time t20. FIG. 6B is an example of a retroactive withdrawal. A retroactive withdrawal of $70 at time t15 is injected into the event stream at time t30. As a result a new state snapshot is created where an $70 withdrawal event occurs at time t15 and as a result a $25 dollar overdraft charge is assesses at time t20 resulting in a balance of minus $35 at time t20.

In some implementations, the ledger can further facilitate 3rd party auditing. The ledger can derive a fingerprint of a set of state snapshots and forward those fingerprints to an external block chain for recording. The fingerprint can be derived so as not to identify the underlying assets and transactions while providing proof of the integrity of the content of the state snapshots. For example the fingerprint can be a one-way hash.

One can store not only present/past snapshots, but also future snapshots. When a stock grant with a four year vesting is issued, the system can insert snapshots following each vest event over the next four years. A user can query for present state, or the historical/expected state in the past/future. One can use the word "scheduled" or "predicted" requests/events/commands in this context.

State snapshots can be associated with one or more "State Timelines", each one having a time-stamp, to indicate what state history was in place at a particular point in time. The idea here being that a retroactive edit can create a parallel timeline that re-uses the same snapshots PRIOR to the retroactive edit, but materializes new snapshots going forward from there.

The following are some examples of components of a UL system that can be implemented in more than one way.

1. Event type definitions can be grouped into "Templates" and the data stored in the Ledger is considered an "instance" of a template. Those templates can define/enforce a "schema" on those instances, stating exactly which properties are allowed or required on those instances.

2. The ledger can support a fixed set of hard-coded JournalManagers instead of a dynamic set provided by users at runtime.

3. The JournalManager can hand-off the event's executable instructions to an external handler or secondary process for evaluation. Doing so can serve to provide stronger isolation between concurrently running events so they cannot interfere with one another. For example, a UL might instantiate a preconfigured Docker container environment with all dependencies loaded, and then ask it to evaluate the small set of instructions associated with the event.

4. The JournalManager can be implemented as two separate logical entities: One for specifying how data is persisted (e.g., a MySQL-backed option or a Bigtable-backed option), and another for how event type instructions are interpreted (e.g., one for Lua syntax and another for Javascript syntax). These separate logical entities are each independently subject to #2 and #3 above.

5. Instead of callbacks being invoked solely in response to some event instructions finishing, they could be triggered directly by a user. For example, here is the path described above:
  User: Do X
    Ledger: Executes X
      Event Type X Definition: Does whatever
      Ledger: Find X hooks
        X hook 1 Definition: Does hook 1 functionality
        X hook 2 Definition: Does hook 2 functionality
The following is a viable alternative (or additional) operational model.
  User: Handle Y
    Ledger: Find Y hooks
      Y hook 1 Definition: Does hook 1 functionality
      Y hook 2 Definition: Does hook 2 functionality The "Journal" can be thought of as the data and the system that holds the data (e.g., database or file system). The "Journal Manager" can be thought of as an "adapter" to convert the data manipulation patterns supported by the Ledger into commands recognized by the underlying persistence layer.

The following is an example. The "Journal" can contain current and historical information about stock option grants. The raw data for the journal can be stored in a PostgreSQL database. An authorized user can then edit an option grant. The Ledger eventually receives instructions to "Place the grant into the specified state". The "Journal Manager" doesn't edit data rather it creates temporal snapshots. The "Journal Manager" translates the instructions into an actual expression to create new data. Thus, the expression of the instructions needs to conform to the persistence layer (in this case, the execution of a SQL INSERT query).

Similarly, the Journal Manager needs to fulfill queries such as "What did X look like at time T". Using the same example, this means understanding enough about how the data is modeled to formulate the right SQL SELECT query to fetch that answer. One could swap out PostgreSQL for MongoDB and in doing so provide an alternative JournalManager implementation.

The Journal Manager can be implemented in Java, Kotlin, or other JVM-based languages. If one implemented this invention in Python instead, the valid JournalManager engine can be Python (or C++ with Python bindings). One can implement the Ledger where the Journal Manager is implemented in an entirely different language, running as a separate process with which the Ledger communicates, in which case there would be no language constraint.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

Figure 7:
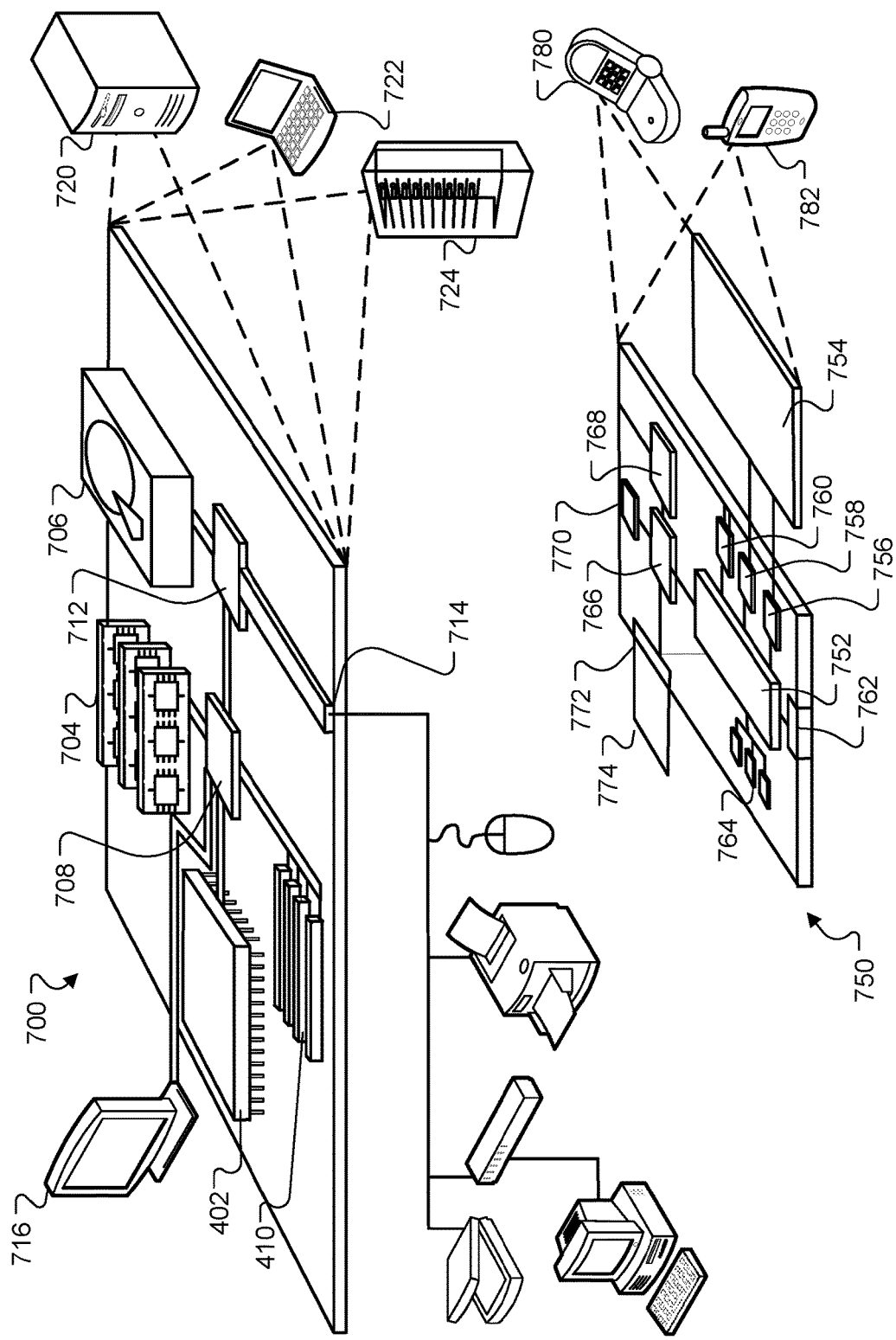
FIG. 7 is a diagram showing an example of hardware that can be used to implement a universal ledger such as the universal ledger of FIG. 1.

FIG. 7 is a block diagram of system components that can be used to implement a system for 100

Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally, computing device 700 or 750 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 708, a high-speed interface 708 connecting to memory 704 and high-speed expansion ports 710, and a low speed interface 712 connecting to low speed bus 714 and storage device 708. Each of the components 702, 704, 708, 710, and 712, are interconnected using various busses, and can be mounted on a common motherboard or in other manners as appropriate. The processor 702 can process instructions for execution within the computing device 700, including instructions stored in the memory 704 or on the storage device 708 to display graphical information for a GUI on an external input/output device, such as display 716 coupled to high speed interface 708. In other implementations, multiple processors and/or multiple buses can be used, as appropriate, along with multiple memories and types of memory. Also, multiple computing devices 700 can be connected, with each device providing portions of the necessary operations, e.g., as a server bank, a group of blade servers, or a multi-processor system.

The memory 704 stores information within the computing device 700. In one implementation, the memory 704 is a volatile memory unit or units. In another implementation, the memory 704 is a non-volatile memory unit or units. The memory 704 can also be another form of computer-readable medium, such as a magnetic or optical disk.

The storage device 708 is capable of providing mass storage for the computing device 700. In one implementation, the storage device 708 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 704, the storage device 708, or memory on processor 702.

The high speed controller 708 manages bandwidth-intensive operations for the computing device 700, while the low speed controller 712 manages lower bandwidth intensive operations. Such allocation of functions is exemplary only. In one implementation, the high-speed controller 708 is coupled to memory 704, display 716, e.g., through a graphics processor or accelerator, and to high-speed expansion ports 710, which can accept various expansion cards (not shown). In the implementation, low-speed controller 712 is coupled to storage device 708 and low-speed expansion port 714. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 700 can be implemented in a number of different forms, as shown in the figure. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown), such as device 750. Each of such devices can contain one or more of computing device 700, 750, and an entire system can be made up of multiple computing devices 700, 750 communicating with each other.

The computing device 700 can be implemented in a number of different forms, as shown in the figure. For example, it can be implemented as a standard server 720, or multiple times in a group of such servers. It can also be implemented as part of a rack server system 724. In addition, it can be implemented in a personal computer such as a laptop computer 722. Alternatively, components from computing device 700 can be combined with other components in a mobile device (not shown), such as device 750. Each of such devices can contain one or more of computing device 700, 750, and an entire system can be made up of multiple computing devices 700, 750 communicating with each other.

Computing device 750 includes a processor 752, memory 764, and an input/output device such as a display 754, a communication interface 766, and a transceiver 768, among other components. The device 750 can also be provided with a storage device, such as a micro-drive or other device, to provide additional storage. Each of the components 750, 752, 764, 754, 766, and 768, are interconnected using various buses, and several of the components can be mounted on a common motherboard or in other manners as appropriate.

The processor 752 can execute instructions within the computing device 750, including instructions stored in the memory 764. The processor can be implemented as a chipset of chips that include separate and multiple analog and digital processors. Additionally, the processor can be implemented using any of a number of architectures. For example, the processor 710 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 750, such as control of user interfaces, applications run by device 750, and wireless communication by device 750.

Processor 752 can communicate with a user through control interface 758 and display interface 756 coupled to a display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can be provide in communication with processor 752, so as to enable near area communication of device 750 with other devices. External interface 762 can provide, for example, for wired communication in some implementations, or for wireless communication in other implementations, and multiple interfaces can also be used.

The memory 764 stores information within the computing device 750. The memory 764 can be implemented as one or more of a computer-readable medium or media, a volatile memory unit or units, or a non-volatile memory unit or units. Expansion memory 774 can also be provided and connected to device 750 through expansion interface 772, which can include, for example, a SIMM (Single In Line Memory Module) card interface. Such expansion memory 774 can provide extra storage space for device 750, or can also store applications or other information for device 750. Specifically, expansion memory 774 can include instructions to carry out or supplement the processes described above, and can include secure information also. Thus, for example, expansion memory 774 can be provide as a security module for device 750, and can be programmed with instructions that permit secure use of device 750. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that can be received, for example, over transceiver 768 or external interface 762.

Device 750 can communicate wirelessly through communication interface 766, which can include digital signal processing circuitry where necessary. Communication interface 766 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 768. In addition, short-range communication can occur, such as using a Bluetooth, Wi-Fi, or other such transceiver (not shown). In addition, GPS (Global Positioning System) receiver module 770 can provide additional navigation- and location-related wireless data to device 750, which can be used as appropriate by applications running on device 750.

Device 750 can also communicate audibly using audio codec 760, which can receive spoken information from a user and convert it to usable digital information. Audio codec 760 can likewise generate audible sound for a user, such as through a speaker, e.g., in a handset of device 750. Such sound can include sound from voice telephone calls, can include recorded sound, e.g., voice messages, music files, etc., and can also include sound generated by applications operating on device 750.

The computing device 750 can be implemented in a number of different forms, as shown in the figure. For example, it can be implemented as a cellular telephone 780. It can also be implemented as part of a smartphone 782, personal digital assistant, or other similar mobile device.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    loading journal manager engine instructions for a journal manager engine into journal manager engine memory, the journal manager engine instructions being stored by a journal that stores instructions and a series of transactions including a time of each transaction in the series of transactions, wherein the journal manager engine reads from, and writes to, the journal, wherein the journal manager engine instructions are based on a template;
    receiving a register transaction type request for a first transaction type at the journal manager engine, wherein the register transaction type request includes a first transaction type operation definition that specifies at least one type of action that can be performed as part of the first transaction type;
    loading a register transaction type operation definition for a register transaction type operation in response to the register transaction type request, wherein the journal stores the register transaction type operation definition;
    writing the register transaction type transaction to the journal;
    executing the register transaction type operation in response to the register transaction type request and based at least in part on the register transaction type operation definition to produce a first transaction type operation definition; and
    recording the first transaction type operation definition in the journal.

2. The method of claim 1, wherein the method further comprises loading a definition of hooks into the journal manager based at least in part on the register transaction type request.

3. The method of claim 2, wherein the method further comprises executing callbacks based at least in part on the definition of hooks.

4. The method of claim 1, wherein the journal manager and the journal are part of a ledger, wherein the register transaction type request is a request to create a first transaction type that the ledger can perform, and wherein the method further comprises:
    receiving a transaction request for a transaction of the first transaction type; and
    performing the transaction of the first transaction type.

5. The method of claim 4, wherein the transaction request is to recalculate a state of a parameter at a first time, and wherein the journal stores a first state for the parameter at the first time based on a request made at a second time wherein the first state is different than a second state for the parameter at the first time based on a request made at a third time.

6. The method of claim 4, wherein the journal comprises a series of state snapshots, each state snapshot having a time-stamp.

7. The method of claim 6, wherein the method further comprises creating a fingerprint of at least one state snapshot and forwarding the fingerprint to a trusted third party.

8. The method of claim 6, wherein state snapshots are incorporated into one or more state timelines.

9. The method of claim 4, wherein the ledger is extensible at runtime allowing a client to update dynamically which instructions the ledger executes.

10. The method of claim 1, wherein the register transaction type request is based at least in part on a template.

11. The method of claim 1, wherein receiving a register transaction type request comprises receiving a register transaction type request via an application programming interface.

12. A system comprising:
one or more computers and one or more storage devices on which are stored instructions that are operable, when executed by the one or more computers, to cause the one or more computers to perform operations comprising:
loading journal manager engine instructions for a journal manager engine into journal manager engine memory, the journal manager engine instructions being stored by a journal that stores instructions and a series of transactions including a time of each transaction in the series of transactions, wherein the journal manager engine reads from, and writes to, the journal, wherein the journal manager engine instructions are based on a template;
receiving a register transaction type request for a first transaction type at the journal manager engine, wherein the register transaction type request specifies at least one type of action that can be performed as part of the first transaction type;
loading a register transaction type operation definition for a register transaction type operation in response to the register transaction type request, wherein the journal stores the register transaction type operation definition;
writing the register transaction type request to the journal;
executing the register transaction type operation in response to the register transaction type request and based at least in part on the register transaction type operation definition to produce a first transaction type operation definition; and
recording the first transaction type operation definition in the journal.

13. The system of claim 12, wherein the system further comprises allowing a first transaction to be executed as if implemented on a specific past date and to replay subsequent transactions based on executing the first transaction on a specific past date.

14. The system of claim 12, wherein the journal manager engine is extensible at runtime.

15. The system of claim 12, wherein the operations further comprise loading a definition of a hook into the journal manager based at least in part on the register transaction type request.

16. The system of claim 15, wherein the operations further comprise executing a callback based in part on the definition of the hook.

17. The system of claim 12, wherein the journal manager and the journal are part of a ledger, wherein the register transaction type request is a request to create a first transaction type that the ledger can perform, and wherein the operations further comprises:
receiving a transaction request for a transaction of the first transaction type; and
performing the transaction of the first transaction type.

18. The system of claim 17, wherein the transaction request is to recalculate a state of a parameter at a first time, wherein the journal stores a first state for the parameter at the first time based on a request made at a second time, and wherein the first state is different than a second state for the parameter at the first time based on a request made at a third time.

19. The system of claim 17 wherein the journal comprises a series of state snapshots, each state snapshot having a time-stamp, and wherein the operations further comprise creating a fingerprint of a state snapshot and forwarding the fingerprint to a blockchain.

* * * * *